United States Patent [19]

Blaser et al.

[11] Patent Number: 5,148,715
[45] Date of Patent: Sep. 22, 1992

[54] ACTUATOR OR ADJUSTING DRIVE

[75] Inventors: Peter-Theobald Blaser, Dielheim; Walter Hofheinz, Heidelberg, both of Fed. Rep. of Germany

[73] Assignee: Heidelberger Druckmaschinen AG, Heidelberg, Fed. Rep. of Germany

[21] Appl. No.: 615,473

[22] Filed: Nov. 19, 1990

[30] Foreign Application Priority Data

Nov. 17, 1989 [DE] Fed. Rep. of Germany ... 8913588[U]

[51] Int. Cl.$^5$ ............................................. F16H 1/02
[52] U.S. Cl. ................................... 74/325; 74/421 A; 464/30
[58] Field of Search ............ 318/466, 470; 74/421 A, 74/325, 421 R; 464/30

[56] References Cited

U.S. PATENT DOCUMENTS

| | | | |
|---|---|---|---|
| 2,172,011 | 9/1939 | Lodge | 464/41 |
| 2,709,923 | 6/1955 | Manning | 74/421 R |
| 3,153,158 | 10/1964 | Schmitter | 74/325 X |
| 3,410,148 | 11/1968 | Clarke | 74/325 X |
| 3,590,653 | 7/1971 | Dreckmann | |
| 3,747,524 | 7/1973 | Crum | |
| 4,170,953 | 10/1979 | Pounder et al. | 74/388 PS X |
| 4,187,734 | 2/1980 | Mann | 74/405 |
| 4,287,782 | 9/1981 | Ruschek | 74/405 |
| 4,385,560 | 5/1983 | Johne et al. | |
| 4,526,252 | 7/1985 | Hirano | 74/421 A X |
| 4,669,578 | 6/1987 | Iukamachi | |
| 4,712,441 | 12/1987 | Abraham | 74/89.15 |
| 4,802,372 | 2/1989 | Harrod et al. | 74/325 |
| 4,848,184 | 7/1989 | Ulbing | 74/640 |
| 4,854,189 | 8/1989 | Ulbing | 74/640 |
| 4,858,481 | 8/1989 | Abraham | 74/89.15 |

FOREIGN PATENT DOCUMENTS

| | | |
|---|---|---|
| 2121377 | 5/1972 | Fed. Rep. of Germany. |
| 3049289 | 11/1981 | Fed. Rep. of Germany. |
| 3744155 | 7/1989 | Fed. Rep. of Germany. |
| 1448923 | 7/1966 | France. |
| 468273 | 7/1937 | United Kingdom .................. 74/325 |
| 1284540 | 8/1972 | United Kingdom. |

*Primary Examiner*—Allan D. Herrmann
*Attorney, Agent, or Firm*—Herbert L. Lerner; Laurence A. Greenberg

[57] ABSTRACT

An actuator or adjusting drive having an electric drive motor connected to an actuating shaft and a position transmitter, comprising a reduction gear unit intermediately connected to the drive motor and the actuating shaft, and a gear drive intermediately connected to the drive motor and the position transmitter, at least one of the reduction gear unit and the gear drive having two bearing shafts extending parallel to one another, and reduction gearwheels formed of a pinion and a spur gear connected thereto so as to be fixed against relative rotation therewith, the reduction gearwheels being exchangeably mounted on the two bearing shafts for selectively varying at least one of quantity and diameter of the reduction gearwheels so that the pinions and the spur gears of the reduction gearwheels are disposed in meshing engagement with one another on different ones of the bearing shafts.

19 Claims, 8 Drawing Sheets

ACTUATOR OR ADJUSTING DRIVE

BACKGROUND OF THE INVENTION

1. Field of the Invention:

The invention relates to an actuator or adjusting drive and, more particularly, to an actuator or adjusting drive for a printing press, the actuator or adjusting drive having an electric drive motor which is connected via a reduction transmission or gear unit to an actuating shaft and via a gear drive to a position transmitter or recorder.

2. Description of the Related Art Including Information Disclosed Under 37 C. F. R. §§1.97-1.99:

It is necessary for adjusting functions to be performed in many areas of technology. Preferably, the adjusting function is remote-controlled, and the position of the actuating or adjusting member is monitored by a position transmitter or recorder.

German Published Prosecuted Patent Application (DE-AS) 21 21 377 discloses a motor-driven actuator or adjusting drive for valves. The actuator or adjusting drive has an electric drive motor, which acts on the valve spindle through the intermediary of a reduction gear unit or transmission. A previously set valve stroke is measured by a position transmitter, so that, for example, an input is available for an electric controller or for an electric remote-position indicator. For this purpose, a potentiometer is provided as the position transmitter, and is connected to an actuating shaft and to the drive motor, respectively, via a slipping clutch and a gear drive The ohmic resistance or resistivity of the potentiometer corresponds to the previously set valve stroke. Due to the design of this heretoforeknown actuator or adjusting drive, it is not suitable for a flexible application and, moreover, it takes up a relatively large amount of space, so that its field of application is limited.

In printing-press technology, actuators or adjusting drives are required for a wide range of tasks. For example, it is possible to use actuators for positioning the suction heads of a sheet-fed press in order to adapt to or match a desired printing format or sheet size, it being advantageous, in this regard, to have a position feedback for the control electronics. The wide range of different tasks for actuators or adjusting drives in printing technology, coupled with the cramped or crowded construction of a printing press technically required in that technology, does not permit unrestricted use or installation of heretoforeknown actuators or adjusting drives.

SUMMARY OF THE INVENTION

It is accordingly an object of the invention to provide an actuator or adjusting drive which overcomes the hereinafore-mentioned disadvantages of the heretoforeknown devices of this general type.

It is another object of the invention to provide an actuator of the aforementioned type which offers a variable, simple solution to various adjusting tasks and with respect to adapting to the necessary adjusting range. In addition, it is an object of the invention to provide such an actuator with a compact construction, especially, an extremely slim shape.

With the foregoing and other objects in view there is provided, in accordance with the invention, an actuator or adjusting drive having an electric drive motor connected to an actuating shaft and a position transmitter, comprising a reduction gear unit intermediately connected to the drive motor and the actuating shaft, and a gear drive intermediately connected to the drive motor and the position transmitter, at least one of the reduction gear unit and the gear drive having two bearing shafts extending parallel to one another, and reduction gearwheels formed of a pinion and a spur gear connected thereto so as to be fixed against relative rotation therewith, the reduction gearwheels being exchangeably mounted on the two bearing shafts for selectively varying at least one of quantity and diameter of the reduction gearwheels so that the pinions and the spur gears of the reduction gearwheels are disposed in meshing engagement with one another on different ones of the bearing shafts.

In accordance with another feature of the invention, the actuator has a housing formed with a front end wall and an intermediate wall spaced therefrom, each of the bearing shafts having one end thereof, respectively, engaging in bores formed in the front end wall and having the other end thereof, respectively, engaging in bores formed in the intermediate wall.

In accordance with a further feature of the invention, the front end wall is formed with a bearing support for the actuation shaft.

In accordance with an added feature of the invention, the drive motor and the position transmitter are mounted on the intermediate wall.

In accordance with an additional feature of the invention, the intermediate wall divides the housing into a first and a second chamber, the electric drive motor and the position transmitter being accommodated in the first chamber, and the reduction gear unit and the gear drive being accommodated in the second chamber.

In accordance with again another feature of the invention, there is provided a housing for the actuator, and wherein the drive motor has two end faces and an output shaft with two ends, respectively, extending in opposite directions from one another at the two end faces of the drive motor, one of the output-shaft ends extending to the reduction gear unit, and the other of the output-shaft ends being connected via the gear drive to the position transmitter, the housing having a first inner compartment located in front of one of the end faces of the electric drive motor, the reduction gear unit being disposed in the first inner compartment, and a second inner compartment located in front of the other end face of the electric drive motor, the gear drive and the position transmitter being disposed in the second inner compartment.

In accordance with again a further feature of the invention, the position transmitter is a potentiometer.

In accordance with again an added feature of the invention, the potentiometer is a ten-turn potentiometer.

In accordance with again an additional feature of the invention, there is provided a slipping clutch connected to and between the gear drive and the position transmitter.

In accordance with yet another feature of the invention, there is provided a slipping clutch disposed in the second chamber and connected to and between the gear drive and the position transmitter.

In accordance with yet a further feature of the invention, there is provided a slipping clutch disposed in the second inner compartment and connected to and between the gear drive and the position transmitter.

In accordance with yet an added feature of the invention, the housing is of hollow cylindrical construction, and the actuating shaft is located on a front end surface of the housing.

In accordance with yet an additional feature of the invention, the hollow cylindrical housing has a circular cross section.

In accordance with still another feature of the invention, the front surface is on the front end wall, and the front end wall is formed as a mounting flange.

In accordance with still a further feature of the invention, the mounting flange is at least partly square-shaped.

In accordance with still an added feature of the invention, the at least partly square-shaped mounting flange has a side length which is substantially equal to the diameter of the housing.

In accordance with still an additional feature of the invention, there is provided a common electrical plug connector for the drive motor and terminals of the potentiometer.

In accordance with another feature of the invention, there is provided a housing for the actuator, and partition walls disposed in the housing for separating at least one of the drive motor, the position transmitter and the slipping clutch from at least one of the reduction gear unit and the gear drive.

In accordance with a further feature of the invention, the drive motor is a coreless squirrel-cage motor.

In accordance with a concomitant feature of the invention, the drive motor is a direct-current motor.

By selecting reduction gearwheels appropriate for the respective actuator or adjusting task, it is possible in a relatively simple manner to set or adjust the reduction ratio both of the reduction gear unit and also of the gear drive. For this purpose, it is necessary merely for the reduction gearwheels, which are selectable in number or amount thereof and/or in the diameter thereof, to be mounted on the bearing shafts belonging to the reduction gear unit and to the gear drive, the bearing shafts being mutually parallel. A greater number of reduction gearwheels results in a higher reduction ratio. Additionally or alternatively, however, the reduction ratio, as stated, can be varied also by way of the diameters of the reduction gearwheels, the diameters of the pinions and the spur gears being matched to one another so that their teeth mesh. If one follows the power-output path from the motor to the actuating shaft and to the position transmitter, respectively, a pinion of a reduction gearwheel on one of the bearing shafts will always be in engagement with a spur gear of a reduction gearwheel on the other bearing shaft, the corresponding pinion of the latter reduction gearwheel, in turn, being in meshing engagement with a spur gear of a further reduction gearwheel mounted on the first-mentioned bearing shaft. The power of the motor is transferred preferably from a pinion disposed at an output-shaft end of the drive motor to a spur gear of the reduction gearwheels. The actuating shaft is driven preferably by a pinion of the last reduction gearwheel in the reduction chain, that reduction gearwheel meshing with a gearwheel connected to the actuating shaft so as to be fixed against relative rotation therewith. The measures according to the invention result in the realization of a modular system in which, except for the reduction gearwheels, it is possible always to use the same module for different actuator or adjusting tasks. In order to adapt to a specific actuator or adjusting task, it is necessary only to mount suitable reduction-gearwheel pairs on the bearing shafts. The utility value of an actuator according to the invention is thus decisively increased because, with just a few manual operations, it can be adapted in a relatively simple manner to its field of application. Only an appropriately small number of parts need be stocked. Through the selection of reduction-gearwheel pairs, it is possible to set or adjust both the actuator travel as well as the actuating force and, at the same time, also to vary the resolution of the position transmitter or to adapt the transmission path to the position transmitter which is used.

Due to the engagement of the respective ends of the bearing shafts in bores formed in the front end wall and in bores formed in the intermediate wall of the housing for the actuator or adjusting drive, not only are the bearing shafts held in a relatively simple manner, but they are also accessible, at least at one end when the front end wall has not yet been installed or has been removed in order to mount the reduction gearwheels on the respective bearing shafts or remove them therefrom.

Due to the front end wall providing a bearing support for the actuating shaft, the latter is supported by the front end wall so that, when the front end wall is installed, a gearwheel mounted on the actuating-shaft end which is located within the housing comes directly into meshing engagement with a corresponding pinion of a reduction gearwheel. Coaxial with the gearwheel, there may be a further gearwheel of smaller diameter, which meshes with one of the reduction gearwheels leading to the position transmitter.

The intermediate wall assumes a double function if it not only, as described, holds the ends of the bearing shafts but also forms a mounting wall for the drive motor and the position transmitter. By dividing the housing into two chambers, of which the first chamber accommodates the drive motor and the position transmitter and the second chamber accommodates the reduction gear unit and the gear drive, assurance is provided that no lubricant can foul the electrical devices of the drive motor and the position transmitter. The intermediate wall is penetrated only by the output-shaft end of the drive motor and by an adjusting element of the position transmitter.

The construction which calls for dividing the housing into inner compartments and providing the drive motor with oppositely extending output-shaft ends extending into those compartments results in an extremely slim shape for the actuator, the diameter of which is determined essentially by the dimensions of the drive motor, because the other components at either end of the end faces of the drive motor are accommodated within an appropriately formed housing. Use is made, therefore, of a drive motor with two output-shaft ends at its two end faces, the output-shaft ends extending in opposite directions to one another, so that one output-shaft end can be used to perform the actuator or adjusting task while the other output-shaft end performs the position-transmitting task. Consequently, the actuating-force and position-transmitting units are independent of one another. This in-line construction (actuating-force unit/drive motor/position-transmitting unit) leads, in addition to the slim shape, also to a possibility of the independent positioning/calibration of the actuating-force and position-transmitting branches, because the disconnection of one branch for calibration work does not lead to the disconnection of the other branch and a change in the reduction ratio of one branch does not have an effect on the reduction ratio of the other branch. Thus, depending upon the actuator task, the two branches can be set or laid out separately and independently of one another.

By providing that the position transmitter is in the form of a potentiometer and, especially, in the form of a ten-turn potentiometer, the cost thereof is kept low, and it simultaneously represents an absolute-value storage device, the information in which is retained even if there is a failure in the power supply or the like. The ten-turn potentiometer version ensures a high resolution of the position-transmitting range.

The connection of the slipping clutch to and between the gear drive and the position transmitter protects against overloads and also facilitates calibration work. The release torque of the slipping clutch is much lower than the torque which would cause damage to the position transmitter, e.g., destruction of the stop of the potentiometer, so that a setting or adjustment against the stop does not lead to any disadvantageous consequences. It is even possible by this means to make an automatic adjustment of the position transmitter.

To achieve a particularly slim shape for the actuator or adjusting drive, it is possible for the gear drive, the slipping clutch and the potentiometer to be disposed in-line or in series with one another.

By providing the hollow-cylindrical housing with a circular cross section, its shape is approximately adapted to the function-dependent shape of particular components of printing presses, such as rollers and cylinders. To this extent, the actuator or adjusting drive according to the invention can also be accommodated in a space-saving manner, for example, in wedge-shaped regions or nips between rollers of the printing press.

By providing a front surface of the housing which is square-shaped and has a side length equal to the diameter of the hollow-cylindrical part of the housing, a highly service-friendly and mounting or assembly-friendly device is presented. In this case, only the corner regions of the square mounting flange protrude beyond the cylindrical outer wall of the housing. For mounting, the actuator can, for example, be inserted axially into an opening in the frame of the printing press, so that its mounting flange comes up against a region of the frame, to which it can be fixed thereat by means of suitable fasteners, e.g., threaded bolts. The mounting or replacement of the actuator is thus very simple.

By providing a common electrical plug connector for the drive motor and the terminals of the potentiometer, the actuator or adjusting drive can be fixed in position relatively simply by its mounting flange and is ready for operation by connecting a single electrical plug connector. Consequently, as already stated hereinbefore, if the unit develops a defect, there is assurance that it can be replaced quickly and without problem.

The partition walls separating the drive motor and/or the position transmitter and/or the slipping clutch from the reduction gear unit and/or the gear drive achieve a high degree of operational reliability for the actuator or adjusting drive by the fact that the drive motor, the slipping clutch and the potentiometer are not exposed to any transmission lubricant.

Other features which are considered as characteristic for the invention are set forth in the appended claims.

Although the invention is illustrated and described herein as embodied in an actuator or adjusting drive, it is not intended to be limited to the details shown, since various modifications and structural changes may be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying drawing, in which.

DESCRIPTION OF THE PREFERRED EMBODIMENTS

Figure 1:
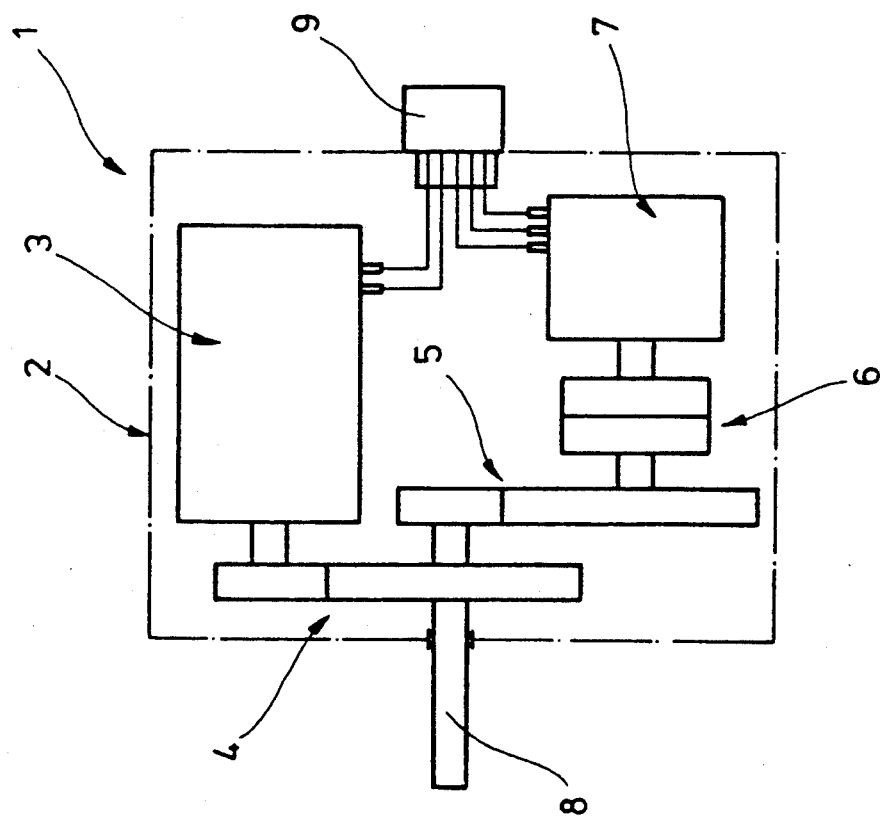
FIG. 1 is a schematic block diagram of an actuator or adjusting drive according to the invention.

Referring now to the figures of the drawings in detail and first, particularly, to FIG. 1 thereof, there is shown therein diagrammatically and schematically an actuator or adjusting drive 1 which has a housing 2 in which a suitably mutually connected assembly of an electric drive motor 3, a reduction transmission or gear unit 4, a gear drive 5, a slipping clutch 6 and a position transmitter 7 is received. The housing 2 is penetrated by an actuating shaft 8, and is provided with an electrical plug connector or junction 9.

Figure 2:
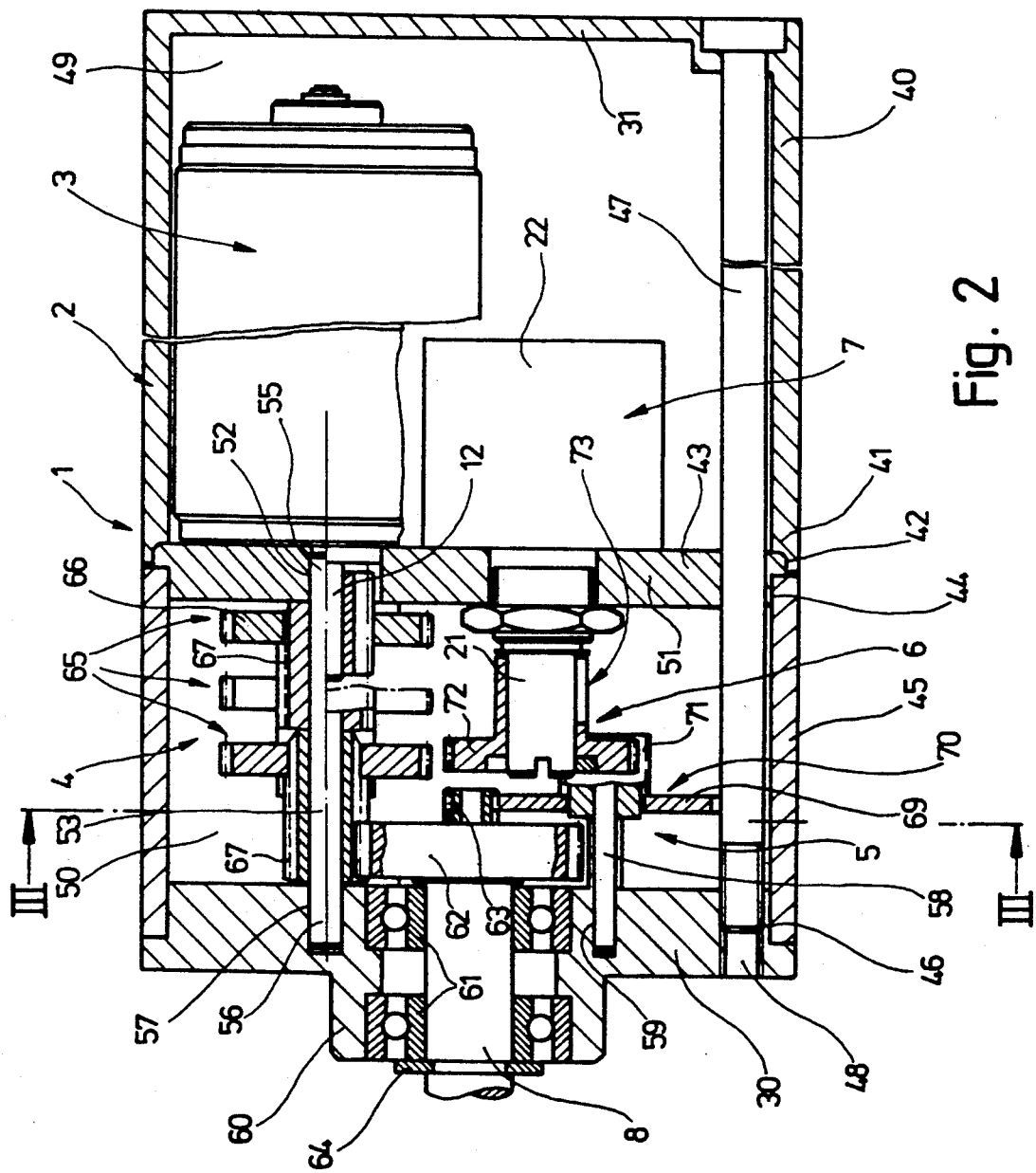
FIG. 2 is a longitudinal sectional view of a first embodiment of the actuator.
Figure 3:
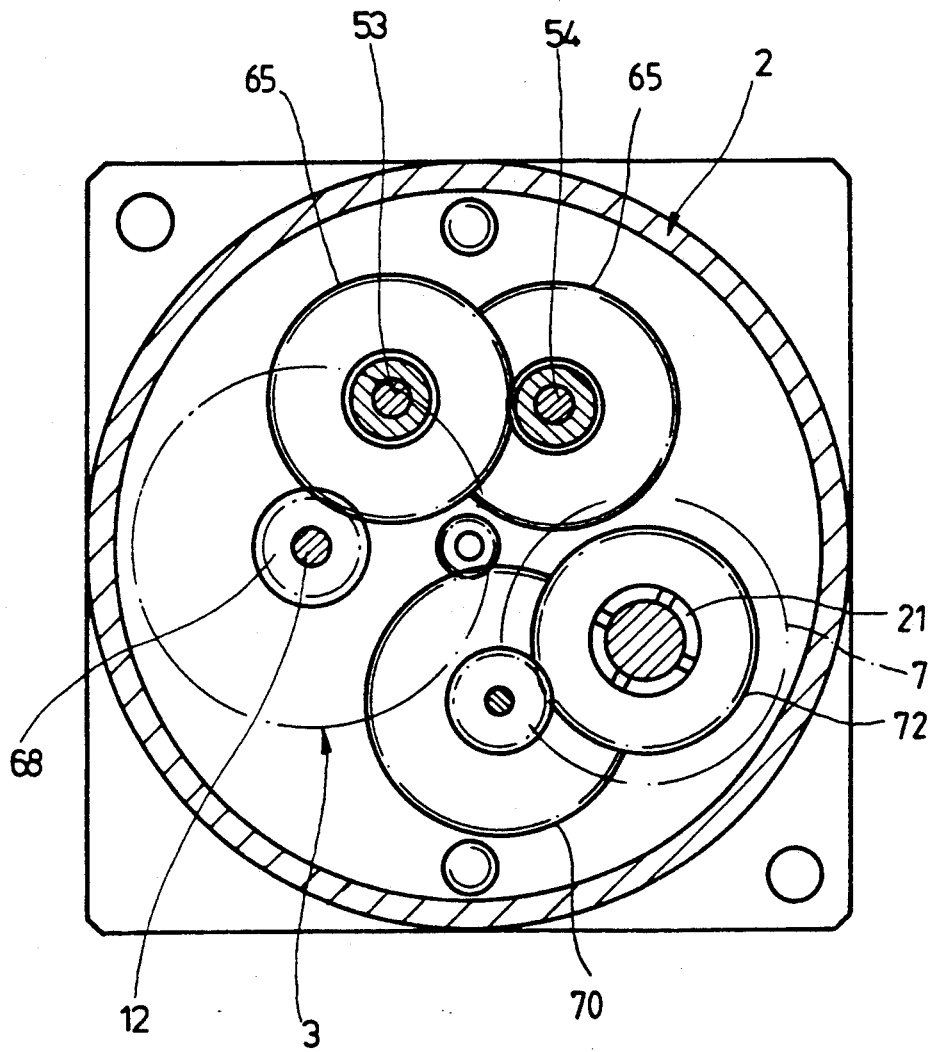
FIG. 3 is a cross-sectional view of FIG. 2 showing taken along the line III—III the interrelationship of several gears of a stepdown transmission forming part of the first embodiment of the invention.

As shown in FIG. 2, the housing 2 is formed of a cup-shaped section 40 having, at a rim or lip 41 thereof, an inner annular step 42 incised therein, into which an intermediate wall 43 is inserted. The intermediate wall 43 is likewise formed with an annular step 44, which is engaged by a cylindrical section 45 of the housing 2. An end wall 30 which is formed with an annular step 46 closes the housing 2 at an end face thereof. From an end wall 31 of the cup-shaped section 40 located at an opposite end of the housing 2 from that at which the end wall 30 is located, threaded bolts 47 extend through the housing 2 and are screwed into threaded bores 48 formed in the end wall 30, thereby clamping the housing 2 together axially, so as to form the intermediate wall 43, the cylindrical section 45, the front wail 30 together with the cup-shaped section 40 into one rigid unit. As shown in FIG. 3, the housing 2 is circular in cross section.

The intermediate wall 43 divides the housing 2 into a first chamber 49, which accommodates the drive motor 3 and the position transmitter 7, as well as into a second chamber 50, which accommodates the reduction transmission or gear unit 4, the gear drive 5 and the slipping clutch 6. The intermediate wall 43 forms a mounting wall 51 for the drive motor 3 and for the position transmitter 7; it is penetrated only by an end 12 of an output shaft of the drive motor 3 and by a shaft 21 of the position transmitter 7.

The intermediate wall 43 is formed with bores 52, into which respective ends 55 of two mutually parallel bearing shafts 53 and 54 of the reduction gear unit 4 are inserted. The other ends 56 of the bearing shafts 53 and 54 engage in bores 57 formed in the end wall 30. The bores 57, just like the bores 52, are preferably formed as blind bores. Furthermore, the intermediate wall 43 is formed with another bore, which is not visible in FIG. 2, for accommodating one end region of a bearing shaft 58 of the gear drive 5, the other end region of the bearing shaft 58 engaging in a bore 59 formed in the end wall 30. The bore 59 is likewise formed as a blind bore.

The end wall 30 is formed with an axial bearing flange 60, which carries two spaced-apart ball bearings 61 for the actuating shaft 8. The latter is connected to a gearwheel 62, as well as to a further, coaxial gearwheel 63 of smaller diameter, so as to be fixed against relative rotation therewith. A clamping ring 64 secures the axial position of the actuating shaft 8. The bearing shafts 53, 54 and 58, as well as the end of the output shaft 12, the actuating shaft 8 and the shaft 21 of the position transmitter 7, extend parallel to one another.

Reduction gearwheels 65 are mountable on the bearing shafts 53 and 54. Each reduction gearwheel 65 is formed of a spur gear 66 and a pinion 67, the latter being of smaller diameter and being connected to the spur gear 66 so as to be fixed against relative rotation therewith. The arrangement calls for the reduction gearwheels 65 to be mounted on the bearing shafts 53 and 54 offset from one another in such a manner that the spur gear 66 of the reduction gearwheel 65 closely adjacent to the intermediate wall 43 meshes with the pinion 68 fastened to the end 12 of the output shaft of the drive motor 3. The corresponding pinion 67 of the aforementioned reduction gearwheel 65 cooperates with a spur gear 66 of a reduction gearwheel 65 mounted on the other bearing shaft. The pinion 67 of the reduction gearwheel 65 meshes, in turn, with a spur gear 66 of a reduction gearwheel 65 disposed on the parallel, aforementioned bearing shaft, and so forth. It is readily apparent that the reduction ratio is determined by the number of reduction gearwheels 65 as well as by the diameters thereof. The diameters of the pinions and of the spur gears are always matched to one another so that these gearwheels mesh with one another, while taking into account the fixed, parallel spacing between the two bearing shafts 53 and 54. The pinion 67 of the reduction gearwheel 65 adjacent to the end wall 30 meshes with the gearwheel 62 of the actuating shaft 8. The gearwheel 63 of the actuating shaft 8 which is coaxial with the gearwheel 62 cooperates with a spur gear 69 of a further reduction gearwheel 70, which is mounted on the bearing shaft 58. A pinion 71 belonging to the reduction gearwheel 70 cooperates with a gearwheel 72 of a clamping sleeve 73, which is friction-locked on the shaft 21 of the position transmitter 7, so as to form the slipping clutch 6. The clamping sleeve 73 is formed as a collet chuck, so that the slipping torque is determined by the clamping force of the spring-loaded arms of the collet chuck.

During operation of the actuator or adjusting drive 1, the drive motor 3 via its pinion 68 drives the pairs of reduction gearwheels 65 of the bearing shafts 53 and 54, which transmit the power of the motor 3 to the gearwheel 62 of the actuating shaft 8. The gearwheel 63, together with the reduction gearwheel 70 mounted on the bearing shaft 58, leads to a further speed reduction, which is transmitted via the pinion 71 and the slipping clutch 6 to the position transmitter 7. The latter is preferably formed as a ten-turn potentiometer 22. The resistance value set at the terminals of the ten-turn potentiometer 22 represents a measure of the angular position of the actuating shaft 8.

Figure 4:
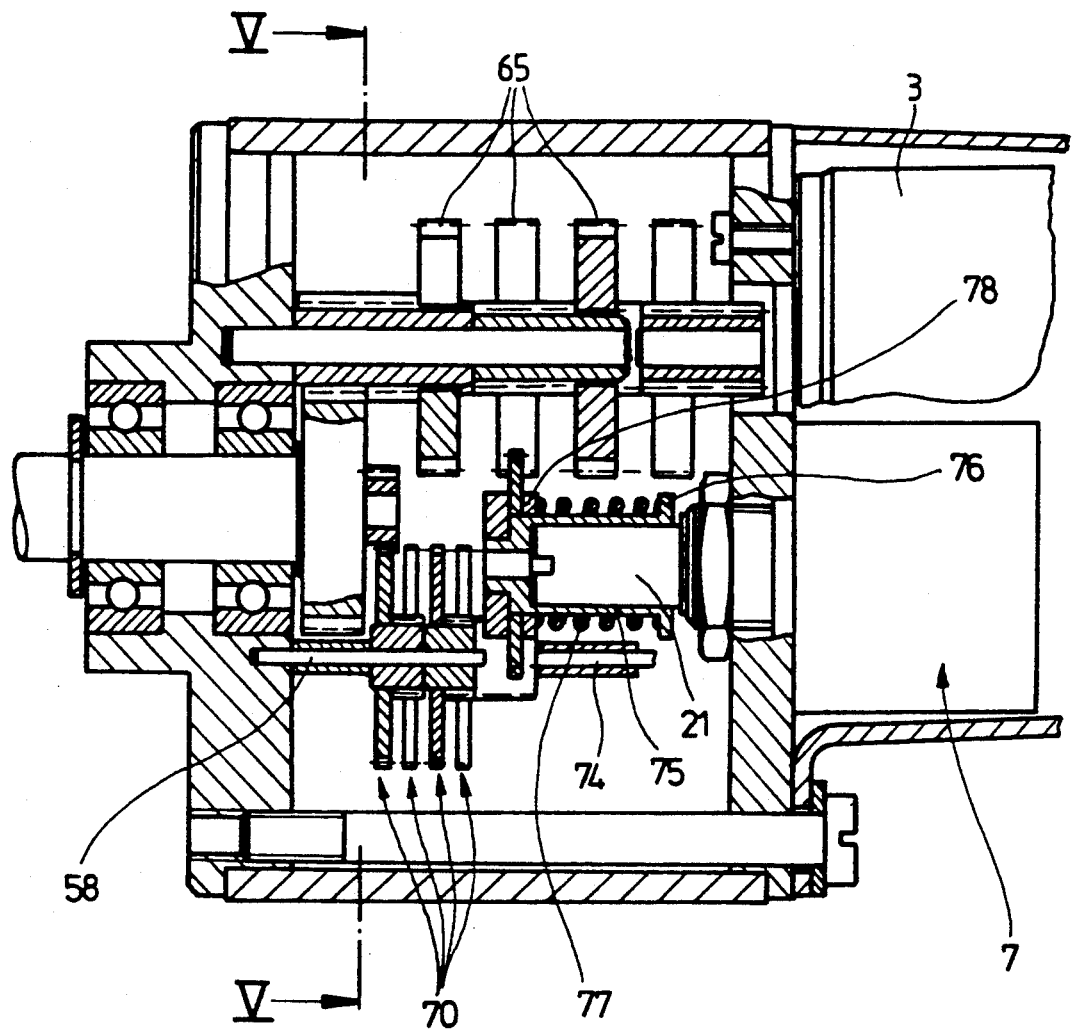
FIG. 4 is a longitudinal sectional view of a second embodiment of the actuator.
Figure 5:
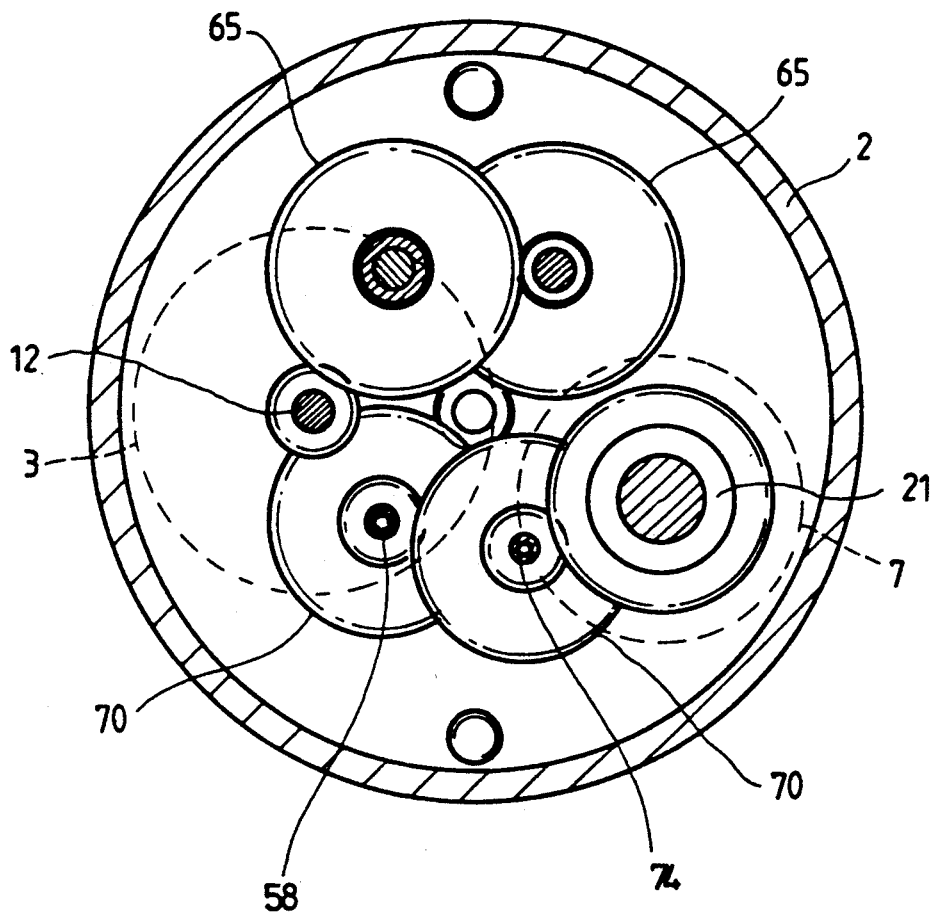
FIG. 5 is a view like that of FIG. 3 of the embodiment shown in FIG. 4.

FIGS. 4 and 5 illustrate a different embodiment of the actuator or adjusting drive 1 according to the invention, wherein like components are identified by the same reference characters. In comparison with the aforedescribed embodiment, the gear drive 5 includes, in addition to the bearing shaft 58, another bearing shaft 74 disposed parallel to the latter, and just as described hereinbefore with respect to the reduction gear unit 4, a plurality of reduction gearwheels 70, provided with spur gear 69 and pinion 71, exchangeably mounted on the bearing shaft 74 as well as on the bearing shaft 58. Furthermore, the slipping clutch 6 is realized by a sleeve 75 forced onto the shaft 21 of the position transmitter 7 so as to be fixed against rotation relative thereto, the sleeve 75 having an annular collar 76 on which one end of a helical compression spring 77 is braced. The other end of the helical compression spring 77 is in contact with an entrainer 78 rotatably mounted on the sleeve 75, the entrainer 78 being driven by the last reduction gearwheel 70 in the drive chain. The spring force determines the transmission torque of the slipping clutch 6.

From the embodiments of the invention shown in FIGS. 2 to 5, it is apparent that the reduction ratios for the actuating shaft 8 and for the position transmitter 7 can be set by mounting suitable reduction gearwheels 65 and 70, respectively, on the bearing shafts 53, 54 as well as 58 and 74. When the end wall 30 is not installed, the bearing shafts 53, 54 as well as 58 and 74 are accessible from one end, so that simple handling or manipulation of the reduction gearwheels 65 and 70 is ensured. When the end wall 30 is installed, a positive or force-locking connection to the actuating shaft 8 is furthermore established.

Figure 6:
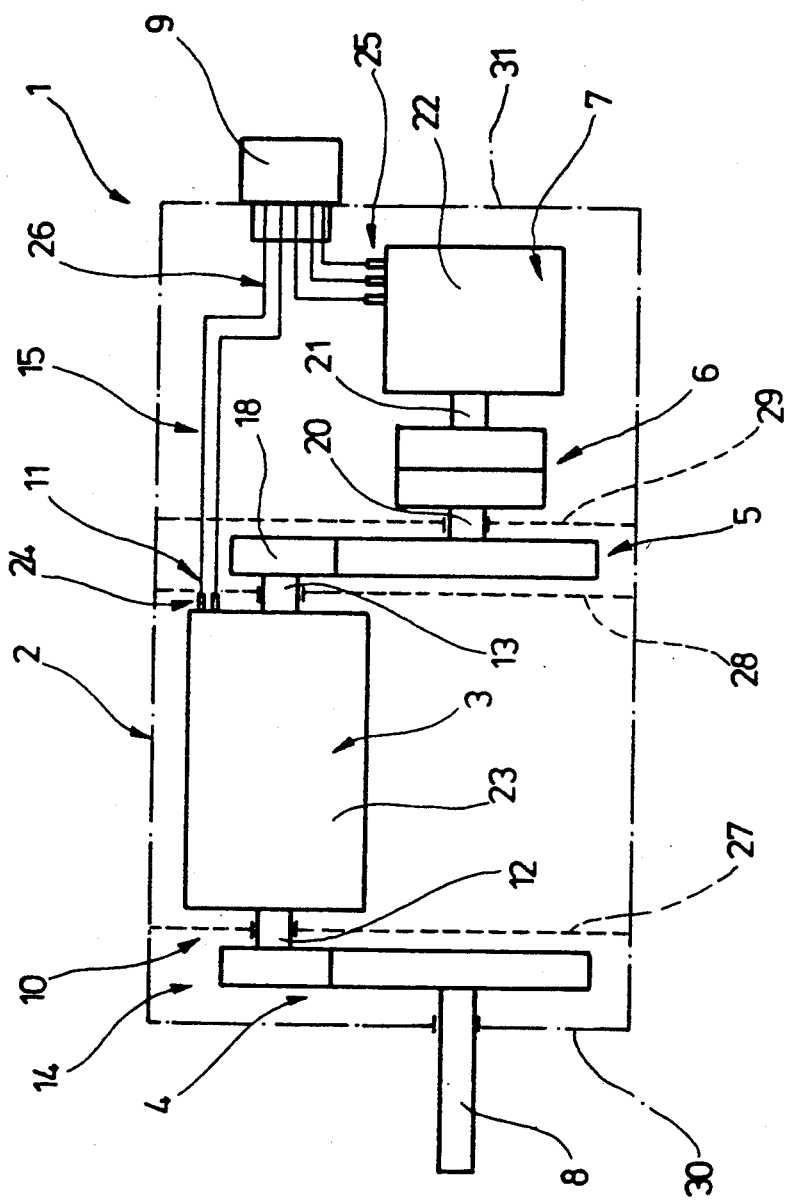
FIG. 6 is a view like that of FIG. 1 of a third embodiment of the actuator or adjusting drive according to the invention.

As in FIG. 6, which is a diagrammatic view of yet another embodiment of the invention, the drive motor 3 is provided at each of its two end faces 10 and 11 with a respective end 12, 13 of an output shaft. The output-shaft ends 12 and 13 extend in opposite directions to one another. The reduction gear unit or transmission 4 is disposed in a first inner compartment 14 of the housing 2 located in front of the end face 10 of the drive motor 3. Situated in front of the end face 11 of the drive motor 3 is a second inner compartment 15 of the housing 2 accommodating the gear drive 5, the slipping clutch 6 and the position transmitter 7. This in-line or series arrangement results in an extremely slim construction of the actuator or adjusting drive 1.

The output-shaft end 12 is connected to the actuating shaft 8 via the reduction gear unit or transmission 4, which is of the same construction as that of the embodiment shown in FIG. 1. Likewise disposed on the output-shaft end 13 of the drive motor 3 is a pinion 18, which cooperates with a gear drive 5 The gear drive 5 is of the same construction as that described with respect to the embodiment shown in FIG. 4. It leads to the slipping clutch 6, which is connected to the position transmitter 7 via a shaft 21. The position transmitter 7 is likewise formed as a ten-turn potentiometer 22. In all of the embodiments, the drive motor 3 which is installed is an ironless or coreless squirrel-cage motor 23 in the form of a direct-current motor. It has electrical terminals 24. The ten-turn potentiometer 22 is provided with terminals 25. The terminals 24 and 25 are connected to the electrical plug connector 9 via lines 26. Consequently, there is a common electrical plug connector 9 both for the drive motor 3 and also for the ten-turn potentiometer 22.

Provided in the embodiment of the invention illustrated in FIG. 6 as a protection against the lubricant for the reduction gear unit 4 and the gear drive 5 are insertable partition walls 27, 28 and 29. The partition wall 27 extends parallel to the end wall 30 of the housing 2, the reduction gear unit 4 being disposed between the end wall 30 and the partition wall 27. The partition walls 28 and 29 extend parallel to the opposite end wall 31 of the housing 2, the gear drive 5 being accommodated therebetween. In the embodiment of the invention shown, the end wall 30 is penetrated by the actuating shaft 8, and the end wall 31 is penetrated by the electrical plug connector 9. The plug connector 9 has non-illustrated locking means for a mating connector.

Figure 7:
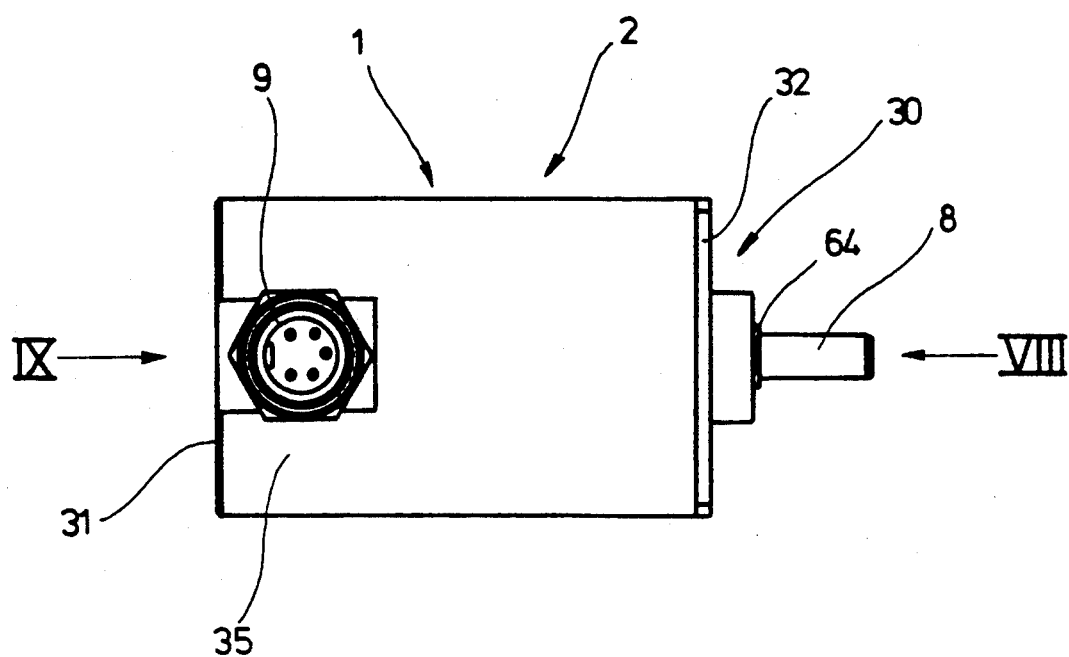
FIG. 7 is a side elevational view of the third embodiment of the actuator shown diagrammatically in FIG. 6.
Figure 8:
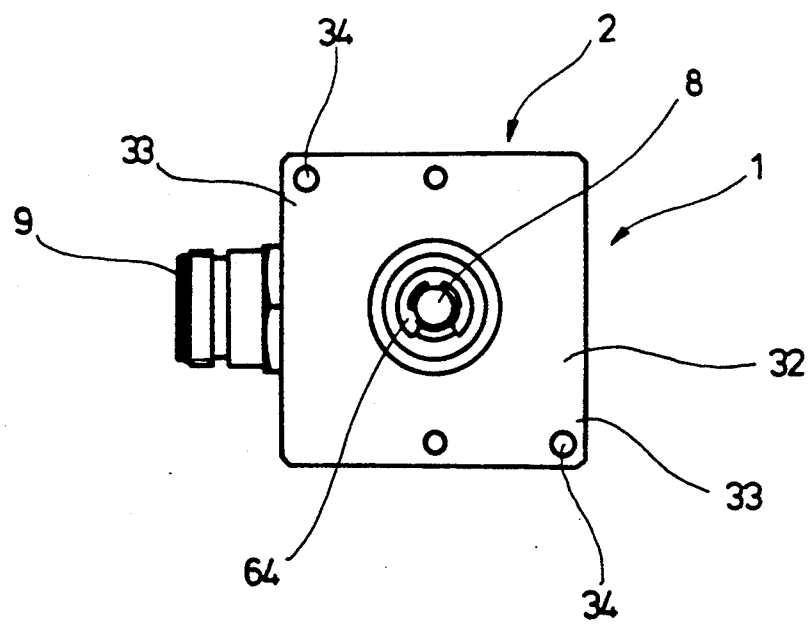
FIG. 8 is a front-end elevational view of FIG. 7 as seen in the direction of arrow VIII therein.
Figure 9:
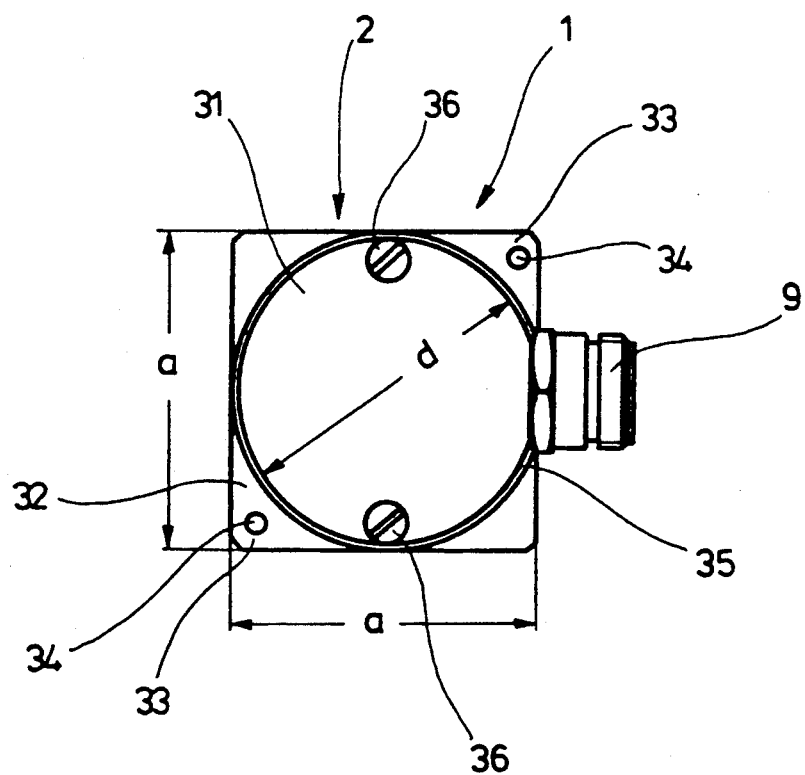
FIG. 9 is a rear-end elevational view of FIG. 7 as seen in the direction of arrow IX therein.

FIGS. 7 to 9 show, in particular, the construction of the housing 2 of the actuator or adjusting drive 1 according to the invention. The housing 2 of the actuator 1 is formed as a hollow cylinder, with the actuating shaft 8 extending centrally from a front surface, namely the front end wall 30, thereof. The hollow-cylindrical housing 2 has a circular cross section. Disposed on the front wall 30 is a mounting flange 32, which is square in plan view. A side length a of the square-shaped mounting flange 32 is equal to the diameter d of the housing 2. For mounting the actuator 1, through-holes 34 are provided at least in two mutually opposing corner regions 33 of the mounting flange 32. In contrast with the embodiment shown diagrammatically in FIG. 6, the electrical plug connector 9 is not situated on the front end wall 31, but rather, on a side casing wall 35 of the housing 2.

The front end wall 31 is removable for the insertion/mounting of components in the housing 2, and is held in position by means of threaded bolts 36.

The actuator or adjusting drive 1 according to the invention forms a compact, user or service-friendly unit which, due to its in-line construction (FIG. 6), has an extremely slim shape. Because the reduction gear unit 4 and the gear drive 5 are formed as exchangeable units with selective reduction ratios, respectively, in all of the embodiments of the invention, it is possible to provide, in a relatively simple manner, during mounting, an actuator or adjusting drive 1 tailored to suit the respective adjusting task. A complete unit is thus provided, because a position feedback (ten-turn potentiometer 22) is integrated therewith. The potentiometer solution results in an absolute storage of the respective existing actuator or adjusting-drive position, which is maintained even in the event of a power failure or the like. The slipping clutch 6, on the one hand, protects the ten-turn potentiometer 22 against overloading and, on the other hand, provides assistance in calibrating or adjusting. During calibration, irrespective of the position of the potentiometer, and even after the potentiometer has assumed the stop position, the actuator or adjusting drive can readily be operated in order, for example, to move to the beginning of the operating or adjusting range of the actuator or adjusting drive. The slipping clutch 6 prevents damage. When the mechanical components have been set or adjusted to the beginning of the operating or adjusting range, it is possible for the desired operating or adjusting range to be passed through, it being necessary, however, to ensure that the adjustment range of the ten-turn potentiometer 22 is not exceeded. Should the latter be the case, it is necessary for a different reduction ratio to be set by exchanging the corresponding unit. The actuator can be used, for example, for positioning a suction head of a sheet-fed printing press, it being possible by remote control to set the position of the suction head to the size of paper by means of the actuator or adjusting drive 1.

The common electrical plug connector 9 provides a particularly simple means of connection for the drive motor 3, as well as for the feedback (ten-turn potentiometer 22). Because of the exchangeable units for the reduction gear unit 4 and the gear drive 5, respectively, all types of actuator or adjusting tasks are able to be handled, the housing 2 always remaining the same for all applications. The design of the drive motor 3 may be based on the short-term operational type which applies in general to all actuator or adjusting tasks, so that no continuous-duty motors are required. Short-term operation is associated with low wear.

What is claimed is:

1. Actuator or adjusting drive having an electric drive motor with an output shaft connected to an actuating shaft and a position transmitter, comprising respective drive gears mounted on the output shaft and on the actuating shaft, and a reduction gear unit intermediately connected to the output shaft of the drive motor and to the actuating shaft via the respective drive gears, said reduction gear unit having two bearing shafts extending parallel to one another and spaced from the output shaft and the actuating shaft, said reduction gear unit comprising sets of reduction gearwheels formed of a pinion and a spur gear connected so as to be fixed against relative rotation therewith, said sets of reduction gearwheels being exchangeably mounted in staggered relationship on said two bearing shafts for selectively varying at least one of quantity and diameter of said sets of reduction gearwheels so that said pinions and said spur gears of said sets of reduction gearwheels are disposed in meshing engagement with one another, respectively, on different ones of said bearing shafts and form a series of reduction gear subunits, a first one of said reduction gear subunits being operatively connected with said drive gear of the output shaft of the drive motor and a last one of said reduction gear subunits being operatively connected with said drive gear of the actuating shaft.

2. Actuator according to claim 1, having a housing formed with a front end wall and an intermediate wall spaced therefrom, each of said bearing shafts having one end thereof, respectively, engaging in bores formed in said front end wall and having the other end thereof, respectively, engaging in bores formed in said intermediate wall.

3. Actuator according to claim 2, wherein said front end wall is formed with a bearing support for the actuation shaft.

4. Actuator according to claim 2, wherein the drive motor and the position transmitter are mounted on said intermediate wall.

5. Actuator according to claim 2, wherein said housing is of hollow cylindrical construction, and the actuating shaft is located on a front end surface of said housing.

6. Actuator according to claim 5, wherein said hollow cylindrical housing has a circular cross section.

7. Actuator according to claim 5, wherein said front surface is on said front end wall, and said front end wall is formed as a mounting flange.

8. Actuator according to claim 7, wherein said mounting flange is at least partly square-shaped.

9. Actuator according to claim 8, wherein said at least partly square-shaped mounting flange has a side length which is substantially equal to the diameter of said housing.

10. Actuator according to claim 2, wherein said intermediate wall divides said housing into a first and a second chamber, the electric drive motor and the position transmitter being accommodated in said first chamber, and said reduction gear unit and said gear drive being accommodated in said second chamber.

11. Actuator according to claim 10, including a slipping clutch disposed in said second chamber and connected to and between said gear drive and said position transmitter.

12. Actuator according to claim 1, wherein said position transmitter is a potentiometer.

13. Actuator according to claim 12, wherein said potentiometer is a ten-turn potentiometer.

14. Actuator according to claim 12, including a common electrical plug connector for said drive motor and terminals of said potentiometer.

15. Actuator according to claim 1, including a slipping clutch connected to and between said gear drive and said position transmitter.

16. Actuator according to claim 15, including a housing for the actuator, and partition walls disposed in said housing for separating at least one of said drive motor, said position transmitter and said slipping clutch from at least one of said reduction gear unit and said gear drive.

17. Actuator according to claim 1, wherein said gear drive intermediately connected to the drive motor and the position transmitter has two mutually parallel bearing shafts respectively carrying at least one rotatable gear pair formed of a pinion and a spur gear connected thereto so as to be fixed against relative rotation therewith, and said drive gear of the actuating shaft being a pinion meshing with a first one of the spur gears of said gear drive, said pinions and the other spur gears of said gear drive being disposed in staggered relationship and in meshing engagement with one another, respectively, on said bearing shafts of said gear drive so as to form a series of reduction gear subunits, a last one of the pinions thereof being in meshing engagement with a gear operatively connected with said position transmitter.

18. Actuator or adjusting drive having an electric drive motor with an output shaft connected to an actuating shaft and a position transmitter, comprising respective drive gears mounted on the output shaft and on the actuating shaft, a reduction gear unit intermediately connected to the drive motor and to the actuating shaft via the respective drive gears, and a gear drive intermediately connected to the drive motor and the position transmitter, said reduction gear unit having two bearing shafts extending parallel to one another, said reduction gear unit comprising sets of reduction gearwheels formed of a pinion and a spur gear connected so as to be fixed against relative rotation therewith, said sets of reduction gearwheels being exchangeably mounted in staggered relationship on said two bearing shafts for selectively varying at least one of quantity and diameter of said sets of reduction gearwheels so that said pinions and said spur gears of said sets of reduction gearwheels are disposed in meshing engagement with one another, respectively, on different ones of said bearing shafts and form a series of reduction gear subunits, a first one of said reduction gear subunits being operatively connected with said drive gear of the drive motor and a last one of said reduction gear subunits being operatively connected with said drive gear of the actuating shaft, and including a housing for the actuator, the drive motor having two end faces and an output shaft with two ends, respectively, extending in opposite directions from one another at said two end faces of the drive motor, one of said output-shaft ends extending to said reduction gear unit, and the other of said output-shaft ends being connected via said gear drive to said position transmitter, said housing having a first inner compartment located in front of one of said end faces of the electric drive motor, said reduction gear unit being disposed in said first inner compartment, and a second inner compartment located in front of said other end face of the electric drive motor, said gear drive and said position transmitter being disposed in said second inner compartment.

19. Actuator according to claim 18, including a slipping clutch disposed in said second inner compartment and connected to and between said gear drive and said position transmitter.

* * * * *